United States Patent
Cruiming (10) Patent No.: US 11,852,246 B2
(45) Date of Patent: Dec. 26, 2023

(54) VALVE ASSEMBLY AND METHOD OF PRODUCING THE SAME

(71) Applicant: Schoeller Allibert GmbH, Schwerin (DE)

(72) Inventor: Eddy Cruiming, Hoogezand (NL)

(73) Assignee: Schoeller Allibert GmbH, Schwerin (DE)

( * ) Notice: Subject to any disclaimer, the term of this patent is extended or adjusted under 35 U.S.C. 154(b) by 417 days.

(21) Appl. No.: 17/268,226

(22) PCT Filed: Aug. 14, 2019

(86) PCT No.: PCT/EP2019/071834
§ 371 (c)(1),
(2) Date: Feb. 12, 2021

(87) PCT Pub. No.: WO2020/035535
PCT Pub. Date: Feb. 20, 2020

(65) Prior Publication Data
US 2021/0317918 A1 Oct. 14, 2021

(30) Foreign Application Priority Data
Aug. 14, 2018 (EP) .................................. 18188958

(51) Int. Cl.
*F16K 1/226* (2006.01)
*F16K 5/06* (2006.01)
*B65D 77/06* (2006.01)

(52) U.S. Cl.
CPC .......... *F16K 1/2261* (2013.01); *B65D 77/061* (2013.01); *B65D 77/067* (2013.01); *F16K 5/0684* (2013.01)

(58) Field of Classification Search
CPC ... F16K 1/2261; F16K 5/0684; B65D 77/061; B65D 77/067
See application file for complete search history.

(56) References Cited

U.S. PATENT DOCUMENTS 1,188,462 A * 6/1916 McCormack ......... F16K 1/2261
251/306
2,054,064 A * 9/1936 Anderson ............. F16K 1/2261
251/306

(Continued)

FOREIGN PATENT DOCUMENTS

CN 101668971 A 3/2010
EP 1975479 A2 10/2008

(Continued)

OTHER PUBLICATIONS

Office Action received in Chinese Application No. 201980046264.1 dated Feb. 22, 2023, with translation, 32 pages.

(Continued)

*Primary Examiner* — Donnell A Long
(74) *Attorney, Agent, or Firm* — Christopher A. Rothe; Culhane Meadows PLLC (57) ABSTRACT

A valve assembly has a stationary valve body and a valve member that is movable relative to the valve body at least from a closed position, in which the valve member cooperates with a valve seat to completely obstruct a fluid path formed through the valve body, to an open position, which allows fluid to flow through the fluid path. The valve member has a disc- or ball-shaped rigid component that is overmolded with a flexible component and at least partially encompasses the rigid component in a circumferential direction to form a ring gasket section.

13 Claims, 5 Drawing Sheets

(56) References Cited

U.S. PATENT DOCUMENTS

| | | | | |
|---|---|---|---|---|
| 2,385,510 | A | * | 9/1945 | Harwood ............ F16K 1/2261 368/291 |
| 2,772,850 | A | * | 12/1956 | Eaton .................. F16K 1/2261 251/308 |
| 3,079,124 | A | * | 2/1963 | Fawkes ................ F16K 5/0684 251/317 |
| 3,111,300 | A | * | 11/1963 | Boone, Sr. ........... F16K 1/2261 251/308 |
| 3,155,368 | A | * | 11/1964 | Shafer ................. F16K 5/0684 251/315.15 |
| 3,195,857 | A | * | 7/1965 | Shafer ................. F16K 5/0684 251/315.15 |
| 3,208,718 | A | * | 9/1965 | Ira ....................... F16K 5/0684 251/315.13 |
| 3,284,046 | A | * | 11/1966 | Allenbaugh, Jr. .... F16K 5/0684 251/315.08 |
| 3,526,385 | A | * | 9/1970 | Rohrer ................. F16K 1/2268 251/306 |
| 3,549,123 | A | * | 12/1970 | Bell ..................... F16K 1/2261 251/306 |
| 4,717,120 | A | | 1/1988 | Fremow et al. |
| 5,765,815 | A | | 6/1998 | Calvin |
| 5,934,645 | A | | 8/1999 | Calvin |
| 2004/0238568 | A1 | | 12/2004 | Brimson |
| 2010/0065763 | A1 | | 3/2010 | Suetome et al. |
| 2011/0017932 | A1 | | 1/2011 | Matos |
| 2017/0328477 | A1 | | 11/2017 | Andoh et al. |

FOREIGN PATENT DOCUMENTS

| | | |
|---|---|---|
| FR | 2924781 A1 | 6/2009 |
| GB | 2297740 A | 8/1996 |

OTHER PUBLICATIONS

Partial European Search Report received in Application No. 18188958.5-1015 dated Feb. 28, 2019, 14 pages.

International Search Report received in Application No. PCT/EP2019/071834 dated Oct. 25, 2019, 4 pages.

Written Opinion of the International Searching Authority received in Application No. PCT/EP2019/071834 dated Oct. 25, 2019, 4 pages.

Office Action received in Canadian Application No. 3,108,831 dated Sep. 21, 2023, 7 pages.

\* cited by examiner

VALVE ASSEMBLY AND METHOD OF PRODUCING THE SAME

CROSS-REFERENCE TO RELATED APPLICATION(S)

This application is the United States national phase entry of International Application No. PCT/EP2019/071834, filed Aug. 14, 2019, and claims the benefit of European Application No. 18 188 958.5, filed Aug. 14, 2018. The contents of International Application No. PCT/EP2019/071834 and European Application No. 18 188 958.5 are incorporated by reference herein in their entireties.

FIELD

The present invention relates to a valve assembly comprising a stationary valve body and a valve member that is movable relatively to the valve body at least from a closed position, in which it cooperates with a valve seat to completely obstruct a fluid path formed through the valve body, into an open position, in which fluid flow through the fluid path is enabled. The invention further concerns a container system and a method for manufacturing a valve assembly.

BACKGROUND

Products made of thermoplastic materials can be manufactured by a number of different manufacturing procedures. The most commonly used methods are however, injection molding, vacuum forming, blow molding and press molding.

Valves of butterfly and of ball type have been known for some time and they can be manufactured from thermoplastic material. Here injection molding and press molding are the most suited manufacturing methods in order to achieve the desired precision. Butterfly valves and ball valves made of thermoplastic materials are mostly used in low-pressure systems. Butterfly valves are often used in ventilation appliances where absolute closing is not necessary. It is also possible to use the valves for fluid media. It will of course be important to have gaskets both in the valve seat as well as at the end of the valve housing. These gaskets are typically made from an elastomeric material, most commonly a thermoplastic material with a plasticizer additive. In many cases, the valve is designed in such a way that material recovery is virtually impossible.

One area where such valves are frequently used is bulk goods, where foldable pallet containers are provided with a bag shaped liner having a valve at the base intended for releasing the goods. This type of packaging is often used in the food industry and will therefore need attention regarding choice of material as well as hygiene. Steam sterilization of the valve area is frequently used before a container is connected to further processing and emptied. This will put some demands on the material used for making the components of the valve.

Typically, the main gasket in valves of the butterfly or the ball type is arranged in the valve seat on the valve body side. The valve seat is usually hard to reach and assembly of the gasket therefore arduous. For this reason, valves of this type often require a bonnet to facilitate assembly. The provision of a bonnet in turn disadvantageously increases the number of components and assembly steps required in manufacture of the valve.

For example, from document U.S. Pat. No. 4,717,120 A it is also known to provide a valve assembly for dispensing liquid from bulk containers. The valve assembly includes a tubular housing defining a cylindrical chamber open at its ends. The housing is connected with an opening in the liner of the container to afford fluid communication between interior of the liner and the chamber. The valve assembly includes a valve shaft having end portions rotatably connected with the housing and a cylindrical body portion extending transversely across the chamber. The shaft body portion contains a slot extending between the end portions for receiving a generally circular butterfly valve disc. The disc has a maximum diameter corresponding with the diameter of the chamber and a minimum diameter corresponding with the length of the slot. An O-ring is connected with the outer edge of the disc. When the valve shaft is rotated to an open position, the disc is arranged longitudinally of the chamber to permit the flow of liquid from the container through the chamber. When the valve shaft is rotated to a closed position, the disc is arranged transversely of the chamber to prevent liquid from flowing therethrough.

Such known liquid dispensing valves have the disadvantage that they are laborious in their assembly. In particular, the valve member requires multiple manual assembly steps, such as assembling the shaft with the valve disc and assembling the O-ring onto the valve disc. Also O-ring gaskets are prone to dislocation thereby potentially compromising the integrity of the seal.

SUMMARY

Because of the above stated disadvantages in known valve assemblies, the present invention is directed towards providing a valve assembly with a simple construction and a reduced number of assembly steps.

In accordance with the invention there is provided a valve assembly comprising a stationary valve body and a valve member that is movable relatively to the valve body at least from a closed position, in which it cooperates with a valve seat to completely obstruct a fluid path formed through the valve body, into an open position, in which fluid flow through the fluid path is enabled. The valve member comprises a disc- or ball-shaped rigid component, which is overmolded with a flexible component and which at least partially encompasses the rigid component in a circumferential direction to form a ring gasket section. In other words, in a butterfly valve assembly or a ball valve assembly according to the invention, the seal gland is applied to the rigid main body of the valve member in a molding process, preferably an injection molding process.

In short, it is preferable according to the invention to directly mold a seal gland/ring gasket onto a valve disc or ball. This reduces the necessary number of assembly steps, components and enables advantageous valve member designs that are not easily implemented by other means. This further opens the possibility to add an adhesive connection between the valve member and the seal gland/ring gasket through substance-to-substance bonding.

According to a preferred embodiment of the invention, the valve member may be manufactured in a 2-component injection molding process, in particular utilizing a thermoplastic or thermoset plastic material for molding the rigid component and utilizing a elastomer or thermoplastic elastomer, preferably a liquid silicone rubber, for overmolding the rigid component with the flexible component.

According to a preferred embodiment of the invention, the valve seat can be made of a rigid material, when compared to the flexible component. Since the gasket/seal gland is arranged on the valve member it is advantageous to provide a hard seat, against which the ring gasket section/ seal gland formed by the flexible component is compressed, when the valve member is positioned in the closed position.

According to a preferred embodiment of the invention, the ring gasket section may have a base surface, which has the form of a circular cylinder shell surface and a gasket lip or protrusion, which protrudes towards the valve seat from the base surface and which extends around the entire circumference of the base surface as a seal gland of sorts that is formed integrally with the base surface.

According to a preferred embodiment of the invention, the valve member can be pivotally mounted inside the valve body and the rigid component can comprises a connecting portion for connecting a shaft of a handle or actuator to the rigid component. In such an embodiment the ring gasket section or seal gland exhibited by the flexible component may preferably comprise a first opening or bearing eye (hole) through which the shaft or the connecting portion is inserted. In other words an opening in the flexible component may be provided that allows for a direct connection between the rigid component and the shaft. Preferably the gasket lip or protrusion (seal gland) be formed on the flexible component surrounding the first opening and configured (in conjunction with the valve seat) to prevent fluids from entering a bearing provided for the shaft. In other words, according to a preferred embodiment of the invention, the gasket lip or protrusion can encompass the first opening on the outer face of the ring gasket section, in particular in a full-circular manner. This arrangement has the advantage that an integral fluid tight sealing for the bearing of the shaft can be realized without necessitating any additional components or assembly steps.

According to a preferred embodiment of the invention, the rigid component may comprise one of an axle portion or an axle receiving portion located diametrically opposed to the connecting portion and the valve body may comprise the other of the axle portion or the axle receiving portion. The axle portion and the axle receiving portion cooperate to form a rotational bearing for the valve member. The ring gasket section of the flexible component can in this case comprise a second opening or bearing eye through which the axle portion or the axle receiving portion is inserted. Preferably another, in particular circular, seal gland or lip may be formed on the flexible component surrounding the second opening and configured (in conjunction with the valve seat) to prevent fluids from entering a bearing provided for the shaft. In other words, according to a preferred embodiment of the invention, the gasket lip or protrusion can further encompass the second opening on the outer face of the ring gasket section, in particular in a full-circular manner. This arrangement has the advantage that an integral fluid tight sealing for the axle portion can be realized without necessitating any additional components or assembly steps.

According to a preferred embodiment of the invention, the gasket lip or protrusion can be aligned with a rotation axis of the valve member. It could also be said that the rotation axis of the valve member can preferably lie within a plane spanned by the circular gasket lip or protrusion (seal gland). This improves the symmetry of force transmission and thus minimizes warping under pressure load.

According to a preferred embodiment of the invention, the rigid component may have a disc shape and the flexible component may cover a face surface of the disc shaped rigid component. This has the background that the sprue or gate can be located in the center of the disc shape warranting an even distribution of the molten flexible component during molding. Analogously, in a 2-component injection molding process, the sprue/gate of the hard component may also be located in the center of the disc shape.

According to a preferred embodiment of the invention, the face surface of the rigid component can be provided with a number of stiffening ribs. This increases form accuracy in an injection molding process to ensure an exact fit between the valve member and the valve seat. In this case, the flexible component can be molded over said ribs thereby exhibiting complementary recesses for receiving said ribs.

According to a preferred embodiment of the invention, the rigid component may have a disc shape and the disc shape may be framed by a circumferential rim projecting perpendicular to the disc face surface (preferably in both directions of the disc). The flexible component can then be molded onto the rigid component, such that it completely encompasses a radial outer face of the rim one side of the rim (corresponding to the tread of a wheel) as well and one complete face surface of the disc shaped rigid component thereby snuggly wrapping around one side of the rim.

According to a further preferred embodiment of the invention, the rim can broaden adjacent to the axle portion or the axle receiving portion and around the connecting portion. This provides greater stability around the rotational joints and also provides a greater base surface for applying/ overmolding the ring shaped seal glands sealing the bearings.

A further aspect of the present invention, which may also be suitable for independent protection, concerns a valve assembly comprising a stationary valve body and a valve member that is movable relatively to the valve body at least from a closed position, in which it cooperates with a valve seat to completely obstruct a fluid path formed through the valve body, into an open position, in which fluid flow through the fluid path is enabled. The valve assembly further comprises a seal gland arranged on either the valve seat or the valve member and which produces a fluid tight seal, when the valve member is positioned in the closed position. According to the invention, the valve member comprises one of an axle portion (protrusion) or an axle receiving portion (recess) and the valve body comprises the other of the axle portion or the axle receiving portion (located at or in the vicinity of the valve seat). The valve member further comprises a connecting portion configured to be connected to a shaft of a handle or an actuator in a positive form lock. The valve body further comprises a through-bore through which the shaft can be inserted from outside the valve body to be connected with the connection portion of the valve member and which comprises a cylindrical bearing section that forms a rotational bearing in cooperation with a corresponding cylindrical section of the shaft. This inventive structural design allows for a simplified assembly of the valve member within the valve body, in which the valve member is pre-mounted by inserting the axle portion into the axle receiving portion in a first step. In a second step, the connecting portion is aligned with the through-bore and the shaft is inserted therethrough and connected with the connecting portion.

According to a preferred embodiment the protruding axle portion may have the shape of a conical stub to facilitate insertion and centration within the bearing.

Advantageously the connecting portion may be a recess (with a polygonal cross-section) that does not protrude over the circular silhouette of the disc or ball shape of the valve member to further facilitate insertion.

Further advantageously the valve member may comprise two integral gasket lips or seal glands provided on its outer face forming a circular sealing barrier around both the axle portion and the connecting portion. This eliminates the necessity for separate sealing members and this reduces the number of parts and assembly steps necessary in manufacturing.

According to another preferred embodiment a snap fit or friction closure may be provided between the shaft and the connection portion for securing the axial positioning between the two components.

A further independent aspect of the present invention concerns a bulk container with a liner bag and a valve assembly comprising a stationary valve body and a valve member that is movable relatively to the valve body at least from a closed position, in which it cooperates with a valve seat to completely obstruct a fluid path formed through the valve body, into an open position, in which fluid flow through the fluid path is enabled, manually via a handle. The handle according to the invention may comprise a shaft that is coaxially aligned with a rotation axis of the valve member and is connected to the valve member with one of its ends to transmit an opening or a closing torque to the valve member. The handle may further comprise an intermediate lever portion that extends from the other end of the shaft in a substantially perpendicular direction to increase a moment arm and a handle portion following the lever portion in the longitudinal direction of the handle. The handle portion is movably connected to the lever portion, such that it can be transferred from a storage position into an operation position. In other words, the handle comprises a joint allowing a handle portion to either be folded away into a storage position, in which the handle does not project from the container and thus is not prone to cause a collision. For operation the handle can be folded out into an operation position in which allows for greater ease of handling.

According to a preferred embodiment at least a section of the handle portion may be oriented perpendicularly to the lever portion and the handle portion can be connected to the lever portion via a rotational joint allowing for rotation along the longitudinal axis of the lever portion. In other words the handle portion may be bent, preferably by 90°. Advantageously the lever portion may be oriented in a horizontal plane (parallel to a container base plane) and the rotational joint can then allow the handle portion to be rotated such that its bent portion is either oriented vertically (storage position) or horizontally (operation position).

A further aspect of the invention concerns a container system including a pallet container with a liner bag and a valve assembly according to one of the aforementioned aspects, wherein the valve assembly is mounted on the pallet container and set into fluid communication with the liner bag (to function as an inlet and/or an outlet).

A further aspect of the invention concerns a method for producing a valve assembly comprising a stationary valve body and a valve member that is movable relatively to the valve body at least from a closed position, in which it cooperates with a valve seat to completely obstruct a fluid path formed through the valve body, into an open position, in which fluid flow through the fluid path is enabled. According to the invention this method comprises at least the step of overmolding a disc- or ball-shaped rigid component with a flexible component in an injection molding process, such that the flexible component at least partially encompasses the rigid component in a circumferential direction to form a ring gasket section.

BRIEF DESCRIPTION OF THE DRAWING FIGURES

Embodiments of the invention will now be described by way of example and with reference to the accompanying drawings, in which.

DETAILED DESCRIPTION

Figure 12:
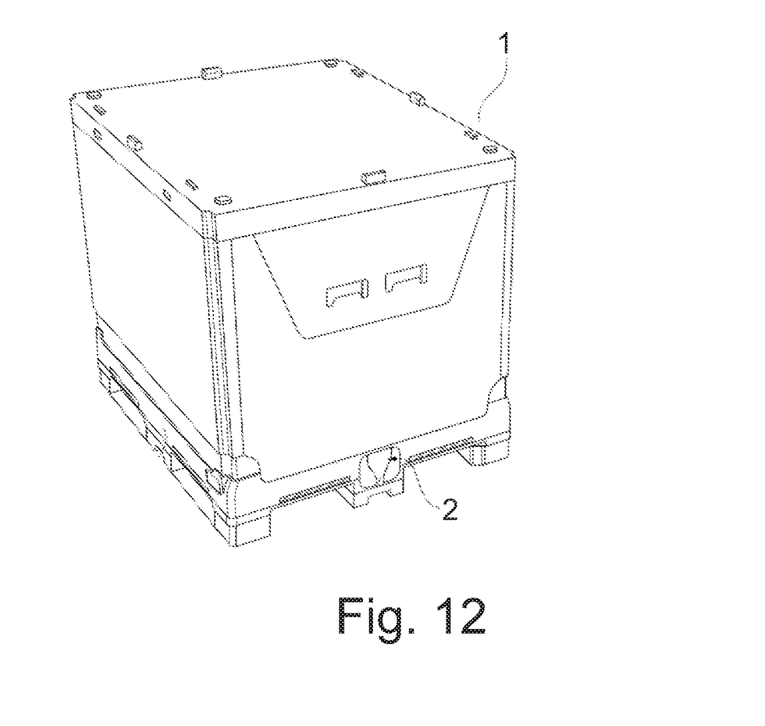
FIG. 12 is a perspective view of a bulk container with a valve assembly according to the invention.

FIG. 12 shows a perspective view of a container 1 according to an exemplary embodiment of the present invention. In particular, a pallet container 1 is shown, having a base with a pallet structure, which is suitable for transport with a forklift or the like, and four foldable side walls. A liner bag (not shown) may be placed inside the pallet container 1 for secure transportation of liquid, granulated, powdered, viscous, paste-like goods or the like. The liner bag comprises or is in fluid communication with a (discharge) valve assembly 2 in proximity to its lower side, which can be securely inserted into a valve socket provided laterally in a lower part of a side wall at base level of the container 1.

Figure 1:
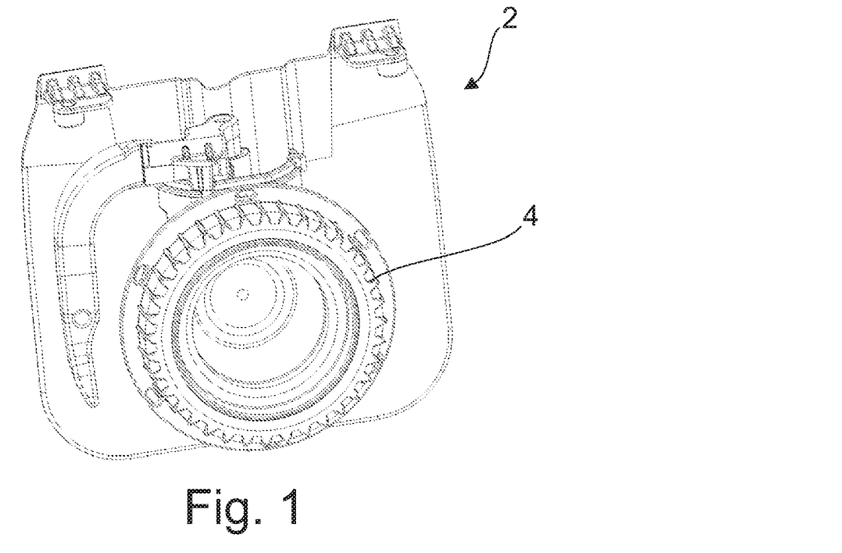
FIG. 1 is a perspective front view of a valve assembly according to a preferred embodiment of the present invention.
Figure 2:
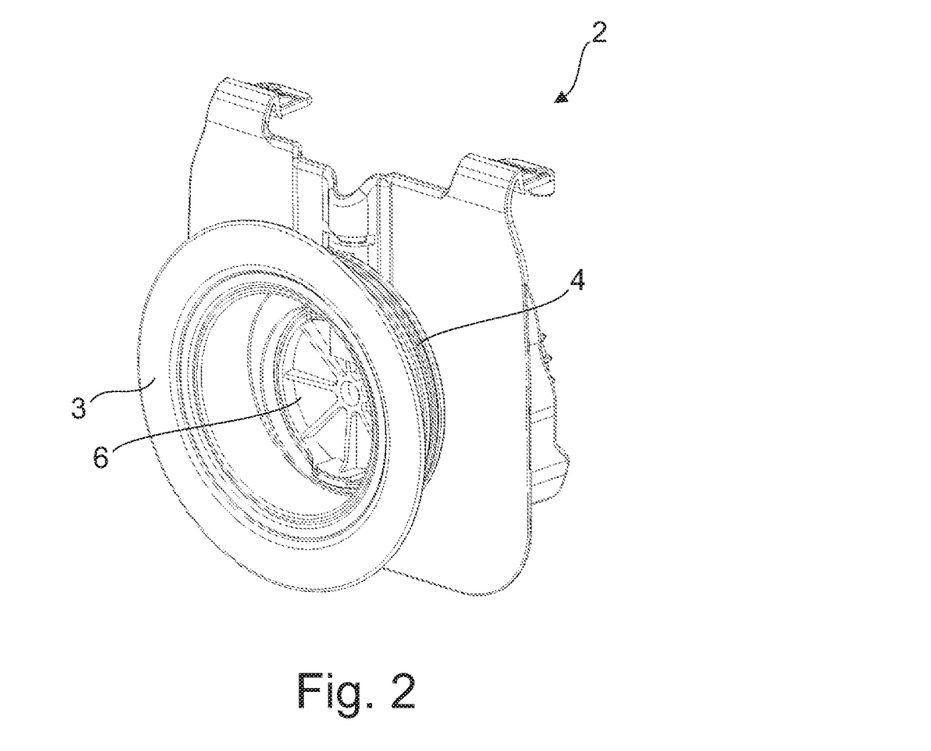
FIG. 2 is a perspective backside view of the valve assembly of FIG. 1.

FIGS. 1 and 2 show a valve assembly 2 according to a preferred embodiment of the invention in a perspective view from two different directions. FIG. 1 shows a front view of the valve assembly, in which the outlet opening is closed with a lid. FIG. 2 shows a back view of the same valve assembly 2. In use, the valve assembly 2 is connected to a liner bag (not depicted) of a bulk container and functions as an outlet valve thereof. For this purpose, a gland 3 is provided which is prepared for being welded to said liner bag through appropriate material selection (in the depicted example LLDPE).

Figure 6:
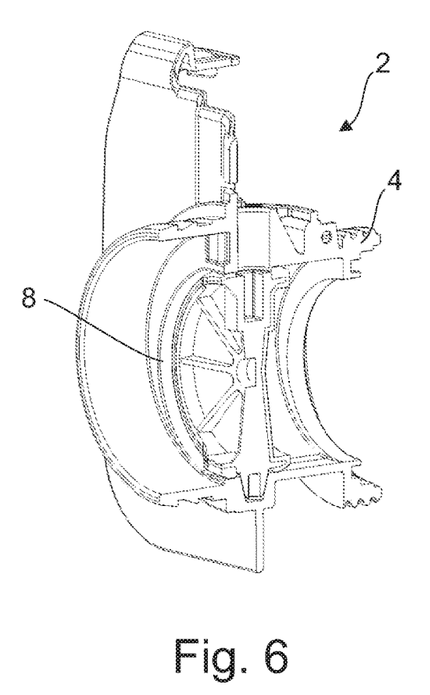
FIG. 6 is a sectional view of a valve assembly according to the preferred embodiment of the present invention in a closed position.
Figure 7:
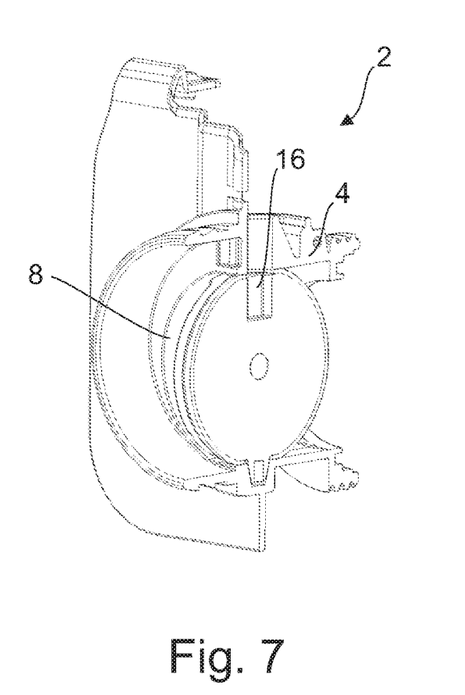
FIG. 7 is a sectional view of a valve assembly according to the preferred embodiment of the present invention in an opened position.

As can be seen e.g. in the sectional views of FIGS. 6 and 7, the valve assembly 2 according to the preferred embodiment comprises a disc shaped valve body 4 exhibiting a fluid passageway (in this case a discharge channel) and a valve member 6 that is movable relatively to the valve body 4. Specifically, the shown valve member 6 is rotatable within a valve seat 8, which is a section of the fluid passageway, from a closed position shown in FIG. 6, in which it cooperates with the valve seat 8 to completely obstruct the fluid passageway, into an open position, in which the disc shaped valve member 6 is in line with the longitudinal passageway direction so that fluid may flow through said passageway.

Figure 3:
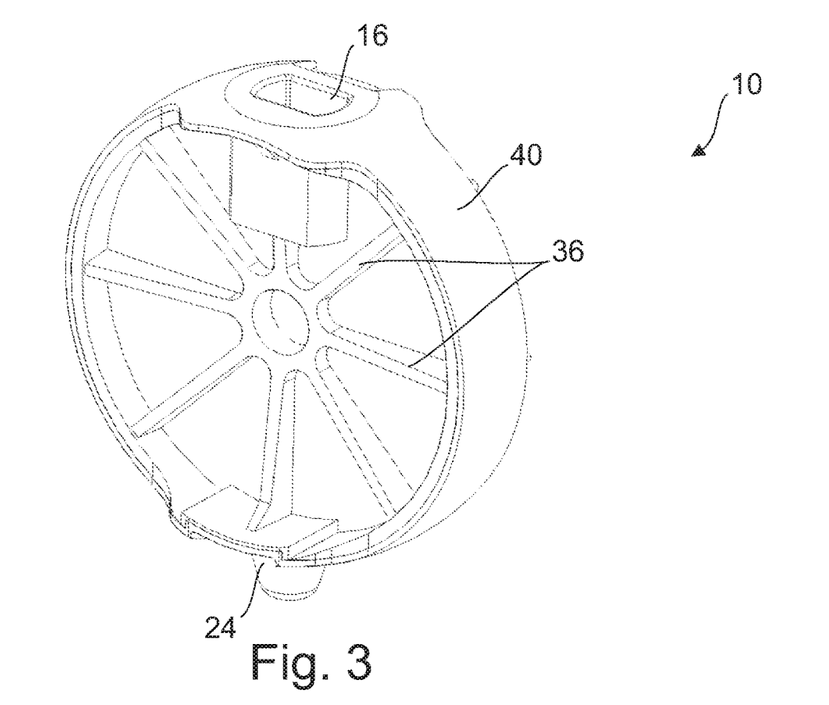
FIG. 3 is a perspective view of a rigid component of the valve member according to the preferred embodiment of the present invention.
Figure 4:
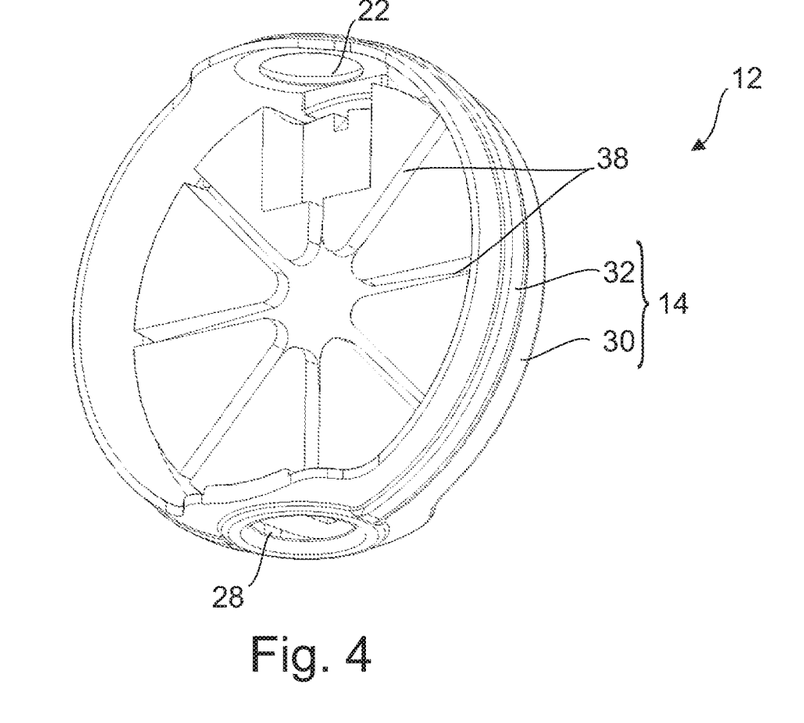
FIG. 4 is a perspective view of a flexible component of the valve member according to the preferred embodiment of the present invention.
Figure 5:
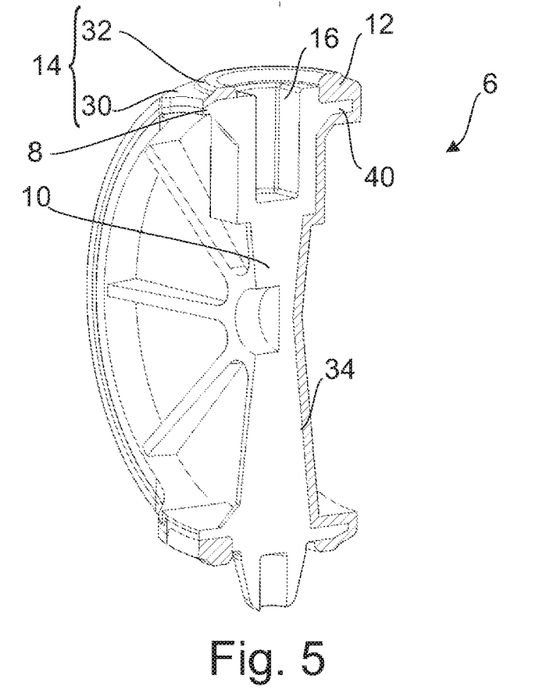
FIG. 5 is a sectional view of a valve member according to the preferred embodiment of the present invention.

As best seen in the cross-sectional view of FIG. 5, the valve member 6 comprises a disc-shaped rigid component 10, which is overmolded with a flexible component 12. FIG. 3 shows am isolated view of the rigid component 10, while FIG. 4 shows an isolated view of the flexible component 12. The rigid component 10 forms the structural core of the valve member 6 by providing stability and rigidity, while the flexible component 12 allows the integrated manufacturing of a fluid tight seal onto the rigid component 10 by forming a ring gasket section 14 thereof.

The rigid component 10 as shown in FIG. 3, is provided with a circumferential rim 40, projecting substantially perpendicular to the plane of the disc and thereby broadening the tread or circumferential surface to provide a broader base for applying the flexible component 12. The rigid component 10 is further provided with a connecting portion 16 (in this case a rectangular recess) that is configured to receive a shaft 18 of a handle (or actuator) 20. The connecting portion 16 is designed such that a torque applied on the shaft 18 is transmitted to the rigid component 10 causing it to rotate within the valve body 4. To enable said rotation, an axle portion 24 is further provided that protrudes diametrically opposed to the connecting portion 16 (and the shaft 18 inserted inside the connection portion 16). The depicted axle portion 24 has a conical shape to facilitate insertion into an axle receiving portion 26 that is provided in the valve body 4 to form a rotational bearing (best seen in FIG. 11). The rigid component 10 is further provided with stiffening ribs 36 that extend in the manner of spokes from a center of the disc shape towards the rim 40 in order to increase the stability of the valve member 6 and also increase shape accuracy/shape retention during the cooling phase of the injection molding process thereby also ensuring the accuracy of fit within the valve seat 8 that is important for good sealing properties. The rim 40 is designed to be broader in the area surrounding the connecting portion 16 and the axle portion 24 to provide a broader base for the flexible component 12, which is important for reasons that will be explained at a later point.

The flexible component 12 as shown in FIG. 4 is molded onto or over the rigid component 10 such that it covers the entire radially facing surface area of the rim 40. In the depicted embodiment, the flexible component also covers one complete face surface 34 of the disc shaped rigid component 10, thereby also encompassing the ribs 36. The flexible component 12 forms a ring gasket section 14 that runs around the entire circumference of the rigid component 10 and that is adapted in shape and diameter to the valve seat 8. The section of the flexible component 12 that adheres to the radially facing surface area of the rim 40 constitutes a base surface 30 of said ring gasket section 14. From this base surface a gasket lip or gasket protrusion 32 protrudes radially outward. This gasket lip or gasket protrusion 32 has a diameter slightly exceeding the diameter of the valve seat 8, so that is compressed against the valve seat, when the valve member 6 is positioned in the closed position. Preferably, the gasket lip or gasket protrusion 32 forms a ring gasket that is aligned with the rotational axis of the valve member 6. To make this possible, the ring gasket section 14 of the flexible component 12 comprises a first opening 22 through which the shaft 18 of the handle 20 is inserted into the connecting portion 16 and a second opening 28, through which the axle portion 24 of the rigid body 10 protrudes. To provide a liquid tight seal in these two areas, in which the ring shape of the gasket is interrupted by the axles of the butterfly valve disc, the gasket lip or gasket protrusion 32 circumvents the first and second opening 26, 28 and forms a circular protrusion around these two openings. This has the technical effect that the line of contact between the gasket lip or gasket protrusion 32 and the valve seat 8 covers the complete circumference thereof in the closed position and also prevents fluid from entering a shaft receiving portion 48 or the axle receiving portion 26 of the valve body 4 regardless of the orientation of the valve member 6.

This improved design of the valve member 6 according to the invention provides multiple advantages. For one, the degree of automation of the manufacturing of the valve member 6 can be increased by producing it in a 2-component injection molding process. Furthermore, the integrated seal according to the design of the preferred embodiment not only seals the valve member 6 against the valve seat 8 but simultaneously seals the rotational bearings 18, 24, 26, 48. This allows for a simplified design of the internal valve components, also referred to as a valve's trim, and also makes the provision of a valve bonnet unnecessary. Assembly can thus take place with two simple step dos first mounting the valve member 6 such that the axle portion 24 is inserted into the axle receiving portion 26 and subsequently inserting the shaft 18 into the connecting portion 16. For this purpose, the valve body exhibits a shaft receiving portion 48, which is a through bore that is coaxially aligned with the axle receiving portion 26. The shaft receiving portion 48 functions as a glide bearing in conjunction with the shaft 18.

Figure 8:
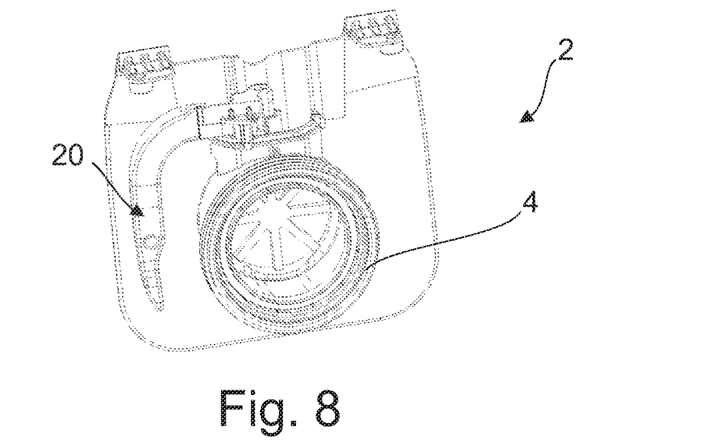
FIG. 8 is a view of the valve assembly with a handle positioned in a storage position.
Figure 9:
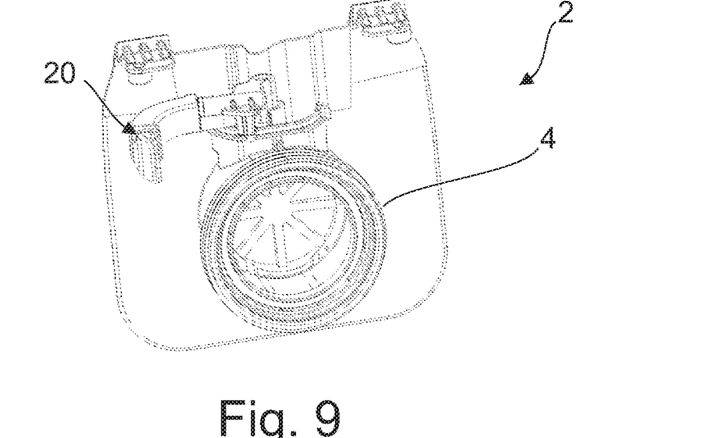
FIG. 9 is a view of the valve assembly with the handle positioned in a operation position.
Figure 10:
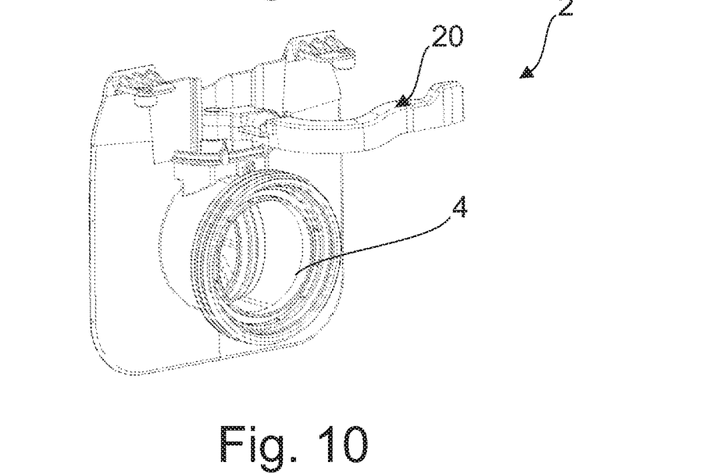
FIG. 10 is a view of the valve assembly in an opened state with the handle positioned in a operation position.
Figure 11:
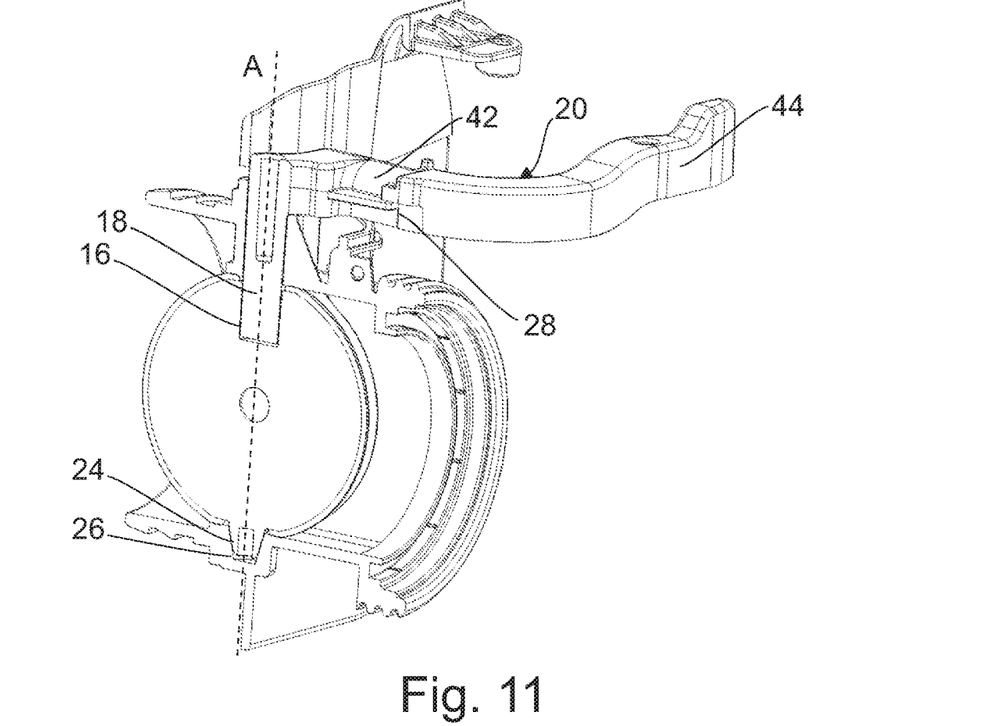
FIG. 11 is a sectional view of the valve assembly in the opened state including the handle.

A further inventive aspect of the valve assembly 2 according to the preferred embodiment concerns the construction of the valve handle 20. As best seen in FIG. 11, the valve handle as an elongate body with a number of bends located between a number of straight sections. The shaft 18 of the handle 20 has already been discussed in the previous paragraph. A lever portion 42 of the handle 20 extends perpendicular form the shaft 18 thereby increasing a lever arm when a force is applied to a handle portion 44, which follows the lever portion 42. The handle portion 44 is connected to the lever portion via a rotational joint 46. Following the rotational joint 46, the handle portion 44 performs a 90° bend. Through this design, the handle portion 44 can be rotated by 90° from a storage position (shown in FIG. 8) to an operation position (shown in FIG. 9) via the rotational joint 46. In the storage position the lever portion 42 and the handle portion 44 of the handle 20 are parallel to the plane of a container wall, in which the valve assembly 2 is mounted. This has the advantage that the handle 20 does not protrude from further from the container wall than the valve body 4, thereby minimizing risk of injury or risk of accidentally damaging the handle 20. The rotational joint 46 comprises a limit stop that limits the rotational degree of freedom at 90° rotation, such that the handle portion 44 extends perpendicular from the plane of the container wall in this limit position and can easily be operated (operation position). It is preferable that the valve is closed, when the lever portion 42 is oriented parallel to the wall, in such a configuration as shown in FIGS. 8 and 9. As shown in FIG. 10 the handle 20 can easily be rotated by 90° around the axis of the shaft 18 in order to completely open the valve assembly 2, once the handle 20 is brought into the operation position.

Starting from the above described preferred embodiment, a container with an exchangeable valve assembly 2 may be altered in numerous ways without deviating from the invention.

For example the valve member 6 may be configured as a ball through which fluid channels are formed to form a ball valve assembly.

As the skilled person will appreciate the positions of protrusions and complementary recesses may be switched in many cases without altering the technical effect, e.g. with the axle portion 24/axle receiving portion 26.

The invention claimed is:

1. A valve assembly comprising:
   a stationary valve body; and
   a valve member that is movable relative to the valve body at least from a closed position, in which the valve member cooperates with a valve seat to completely obstruct a fluid path formed through the valve body, to an open position, in which fluid flow through the fluid path is enabled,
   the valve member comprising a disc- or ball-shaped rigid component that is overmolded with a flexible component and that at least partially encompasses the rigid component in a circumferential direction to form a ring gasket section,
   the valve member being pivotally mounted inside the valve body,
   the rigid component comprising:
   a connecting portion which does not protrude over a circular silhouette of the rigid component for connecting a shaft of a handle or actuator to the rigid component; and
   an axle portion located diametrically opposed to the connecting portion,
   the valve body comprising an axle receiving portion thereby forming a rotational bearing with the axle portion, and
   the ring gasket section of the flexible component comprising:
   a first opening through which the shaft or the connecting portion is inserted; and
   a second opening through which the axle portion or the axle receiving portion is inserted.

2. The valve assembly according to claim 1, wherein the valve seat is made of a first material that is more rigid than a second material that forms the flexible component.

3. The valve assembly according to claim 1, wherein the ring gasket section has a base surface, which has the form of a circular cylinder shell surface and a gasket lip or protrusion that protrudes towards the valve seat from the base surface and extends around the entire circumference of the base surface.

4. The valve assembly according to claim 3, wherein the gasket lip or protrusion is aligned with a rotation axis of the valve member.

5. The valve assembly according to claim 3, wherein the gasket lip or protrusion encompasses the first opening and/or the second opening.

6. The valve assembly according to claim 5, wherein the gasket lip or protrusion encompasses the first opening and/or the second opening in a semi-circular or full-circular manner.

7. The valve assembly according to claim 1, wherein the rigid component has a disc shape and the flexible component covers a face surface of the disc shaped rigid component.

8. The valve assembly according to claim 7, wherein the face surface of the rigid component is provided with a plurality of stiffening ribs, and the flexible component is molded over said ribs thereby exhibiting complementary recesses for receiving said ribs.

9. The valve assembly according to claim 1, wherein the valve member is manufactured in a 2-component injection molding process utilizing a thermoplastic or thermoset plastic material for molding the rigid component and utilizing an elastomer or thermoplastic elastomer for overmolding the rigid component with the flexible component.

10. The valve assembly according to claim 9, wherein the rigid component has a disc shape and a circumferential rim projecting perpendicular to a disc face surface in both directions and the flexible component is molded onto the rigid component, such that the flexible component completely encompasses one side of the rim as well as a radial outer face of the rim and the disc face surface of the rigid component.

11. The valve assembly according to claim 9, wherein a liquid silicone rubber is utilized for overmolding the rigid component with the flexible component.

12. A container system including a pallet container with a liner bag and a valve assembly according to claim 1 that is mounted on the pallet container and set into fluid communication with the liner bag.

13. A method for producing a valve assembly having a stationary valve body and a valve member that is movable relative to the valve body at least from a closed position, in which the valve member cooperates with a valve seat to completely obstruct a fluid path formed through the valve body, into an open position, in which fluid flow through the fluid path is enabled, the method comprising the step of:
   overmolding a disc- or ball-shaped rigid component with a flexible component in an injection molding process, such that the flexible component at least partially encompasses the rigid component in a circumferential direction to form a ring gasket section, wherein
   the valve member is pivotally mounted inside the valve body and the rigid component comprises:
   a connecting portion which does not protrude over a circular silhouette of the rigid component for connecting a shaft of a handle or actuator to the rigid component;
   and an axle portion or an axle receiving portion located diametrically opposed to the connecting portion;
   the valve body comprises the other of the axle portion or the axle receiving portion thereby forming a rotational bearing,
   and the flexible component is molded onto the rigid component such that
   the ring gasket section of the flexible component comprises:
   a first opening through which the shaft or the connecting portion is inserted; and
   a second opening-through which the axle portion or the axle receiving portion is inserted.

* * * * *